United States Patent [19]

Randle

[11] 4,061,575
[45] Dec. 6, 1977

[54] FILTRATION APPARATUS

[75] Inventor: Raymond Thomas Randle, Hartlepool, England

[73] Assignee: Steetley (Mfg.) Limited, England

[21] Appl. No.: 601,055

[22] Filed: Aug. 1, 1975

[30] Foreign Application Priority Data

Aug. 7, 1974  United Kingdom .............. 34851/74

[51] Int. Cl.$^2$ ............................................ B01D 29/04
[52] U.S. Cl. ................................... 210/350; 100/211; 210/411
[58] Field of Search ............... 210/412, 413, 414, 415, 210/411, 416, 418–420, 19, 66, 350, 351, 408, 81, 405, 406; 100/211, 212

[56] References Cited

U.S. PATENT DOCUMENTS

| 2,338,419 | 1/1944 | Forrest et al. | 210/412 |
| 3,454,164 | 7/1969 | Asper | 210/413 X |
| 3,550,775 | 12/1970 | Cooley | 210/414 X |
| 3,753,498 | 8/1973 | Gwilliam | 210/350 |
| 3,795,319 | 3/1974 | Luthi et al. | 210/412 X |
| 3,850,802 | 11/1974 | Berger | 210/413 X |
| 3,900,403 | 8/1975 | Randle et al. | 210/350 |

FOREIGN PATENT DOCUMENTS

| 2,415,477 | 10/1974 | Germany | 210/413 |
| 1,240,466 | 7/1971 | United Kingdom | 210/413 |

Primary Examiner—Frank W. Lutter
Assistant Examiner—Richard L. Chiesa
Attorney, Agent, or Firm—Bacon & Thomas

[57] ABSTRACT

In a filtration apparatus of the type wherein the material to be filtered is fed to an inner compartment between a filter element, supported by a hollow perforated cylindrical body, and a concentric flexible bladder, the bladder being capable of being pressed by a hydraulic fluid against the material to be filtered thus forcing the liquid component through the filter, the inlet to the inner compartment for liquid/solid mixtures comprises a substantially cylindrical chamber provided with circumferentially-spaced apertures adapted to connect with the inner compartment, said chamber being located at one end of the cylindrical body, an inlet line or lines into said chamber and a hollow cylindrical member movably constructed and arranged to cover or expose said apertures.

2 Claims, 3 Drawing Figures

FILTRATION APPARATUS

The present invention relates to a filtration apparatus of the type wherein the material to be filtered is fed to the space between a cylindrical filter and a concentric flexible bladder, the bladder being capable of being pressed by a hydraulic fluid against the material to be filtered thus forcing the liquid component through the filter.

In particular the present invention is concerned with a means for feeding material to be filtered to said space and for removing solid material from the filter surface after filtration.

In the complete specification of our copending U.S. Patent application Ser. No. 454,276, filed Mar. 25, 1974, now U.S. Pat. No. 3,900,403 there is described and claimed a filtration apparatus which comprises a cylindrical housing accommodating a hollow perforated cylindrical body, an impermeable elastic sleeve disposed within the annular space defined by the inside of the housing and the outside of the cylindrical body and preferably circumferentially attached at its ends to the housing of the cylindrical body, thereby dividing the annular space into an inner filtration compartment and an outer pressure applying compartment, a filter element disposed around and supported by the cylindrical body, outlet means for the discharge of filtrate which has passed through the filter element into the cylindrical body, an inlet into the inner compartment for liquid/solid mixtures, an inlet into the outer compartment for a hydraulic fluid under pressure, a pivoted end plate constructed and arranged to permit discharge of filter cake from the inner compartment and preferably an inlet into the interior of the cylindrical body for compressed air.

In the filtration apparatus described and claimed in my U.S. Pat. No. 3,900,403 the filter cake is discharged by moving the pivoted end plate to the open position and expelling the cake through the opening thus created. In an alternative form of filtration apparatus, the pivoted end plate is dispensed with and the hollow perforated cylindrical body, or candle, can be displaced axially relative to the cylindrical housing so that the cake adhering to the candle is exposed and can be discharged. This type of apparatus is described in U.K. Pat. Specification No. 1,240,466. Such a filtration apparatus will be referred to hereinafter as a candle displacement filtration apparatus of the kind set forth.

The present invention provides candle displacement filtration apparatus of the kind set forth wherein the inlet to the inner compartment for liquid/solid mixtures comprises a substantially cylindrical chamber provided with circumferentially spaced apertures adapted to connect with the inner compartment, said chamber being located at one end of the cylindrical body in an extension thereof, an inlet line or lines into said chamber and a hollow cylindrical member coaxial with said extension and movably constructed and arranged to cover or expose said apertures and to form with said extension a cell the ends of which are defined by flanges extending from said hollow cylindrical member and slidably engaging with the walls of said extension, said cell being divided by a piston integral with said extension, means being provided on either side of said piston for supplying or venting air to or from either side of the cell.

Preferably the cylindrical member is provided with apertures which, in one position of the member, coincide with the apertures in the chamber.

A particular embodiment of the present invention provides a candle displacement filtration apparatus of the kind set forth wherein the inlet to the inner compartment for liquid/solid mixtures comprises a substantially cylindrical chamber provided with circumferentially-spaced apertures adapted to connect with the inner compartment, said chamber being located at one end of the cylindrical body, an inlet line or lines into said chamber and a hollow cylindrical member movably constructed and arranged to cover or expose said apertures. Preferably in this embodiment of the present invention the chamber is located in an extension of the cylindrical body and the hollow cylindrical member is arranged coaxially with said extension and to form with said extension a cell the ends of which are defined by flanges extending from said hollow cylindrical member and slidably engaging with the walls of said extension, said cell being divided by a piston integral with said extension, means being provided on either side of said piston for supplying or venting air to or from either side of the cell.

The present invention will now be more particularly described and illustrated, by way of example, with reference to the accompanying drawings in which.

Figure 1A:
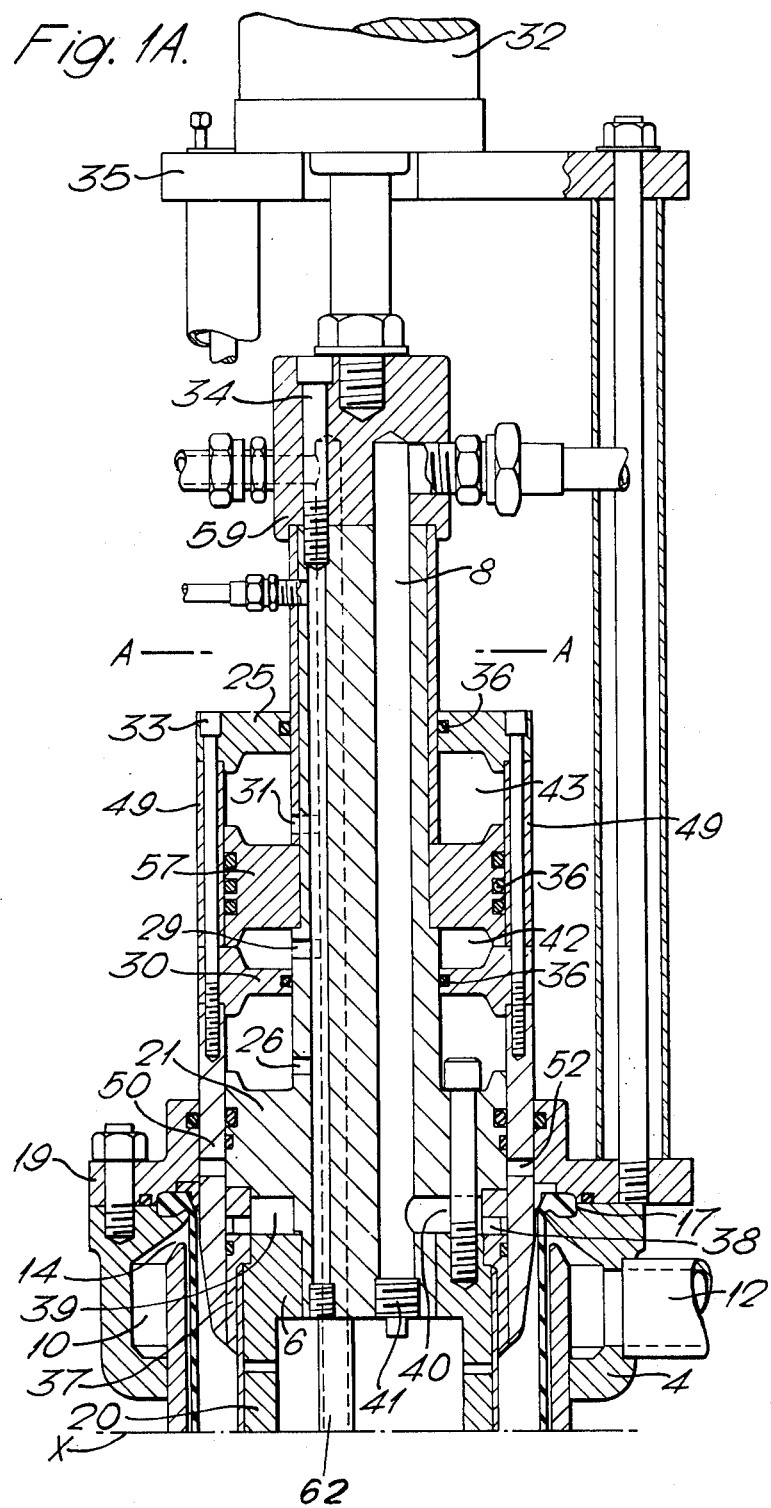
FIG. 1A is a side elevation of the upper part of a filtration apparatus according to the present invention.
Figure 1B:
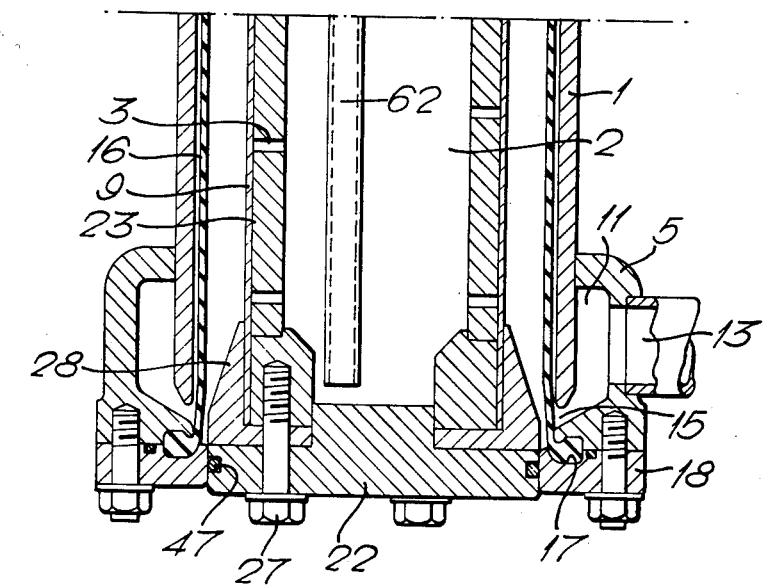
FIG. 1B is a side elevation of the remainder of the filtration apparatus shown in FIG. 1A, below the line X thereof.
Figure 2:
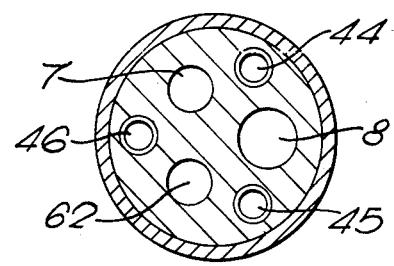
FIG. 2 is a cross-section on line A—A of FIG. 1A.

Referring to the drawings a filtration apparatus is depicted having a tubular case 1 and disposed therein a tubular filtration unit generally indicated as 2. Welded to the tubular case are hollow flanges members 4 and 5 which are so shaped as to form manifold chambers 10 and 11. These are connected to a source of hydraulic fluid via conduits 12 and 13 and to the inside of tubular case 1 via ducts such as 14 and 15.

An annular member 18 is bolted to flange member 5 and an annular member 19 is bolted to flange member 4. A flexible rubber sleeve 16 is nipped and sealed in channel 17 provided in flange members 4 and 5 and in annular members 18 and 19.

The filtration unit 2 comprises a cylindrical metal tube 20 provided with a plurality of apertures 3 and sealed by a services unit 21, bolted to flange member 6 of tube 20, and a lower end plate 22 bolted by bolts 27 to tube 20. Plate 22 is provided with an "O" sealing ring 47 which, in the position of tube 20 illustrated, bears against annular member 18. A filter cloth 9 and filter cloth support 23 held in position by fairings 37 and 28 are positioned around metal tube 20.

Services unit 21 carries a slurry feed line 8, a filtrate line 62, air blow line 7, air lines 44 and 45 and a vent line 46. Line 8 connects with a chamber 39 and is sealed at its bottom end by a plug 41. Chamber 39 is bounded by unit 21, tapered fairing 37 and flange member 6. Fairing 37 is provided with a plurality of ducts 38 connecting with chamber 39.

A filtrate line extends from unit 21 into tube 20 and terminates about 0.5 inches from plate 22. Air blow line 7 connects with the interior of tube 20. Air line 44 is connected with a port 31 in unit 21 and air line 45 is connected with a port 29 in unit 21. Vent line 46 is connected with a port 26 in unit 21.

An outer movable cylinder 49 is provided which slidably engages with unit 21 by means of inwardly extending flanges 25 and 30 and by means of a piston 57 integral with unit 21. The flanges 25 and 30 form with piston 57 two cells 42 and 43 into which ports 29 and 31 lead. Bolted to cylinder 49 is a feed ring 50 having a plurality of apertures 52, said feed ring being adapted to slide between annular member 19 and the lower part of the casing of unit 21.

Connected to the top part of unit 21 is an adaptor 59 carrying lines 7, 8 and 62. The adaptor is in turn connected to a pneumatic jack 32. Jack 32 is also connected to tripod 35.

Sealing rings 36 are provided as necessary and as indicated in the drawing.

In operation a vacuum is applied to draw rubber sleeve 16 against the inside of case 1. Air at 100 psi is introduced via line 45 and port 29 into cell 42 thereby pushing down flange 30. At the same time port 31 is open to exhaust through air line 44 and air in cell 43 is pushed out. As a result of the forcing down of flange 30 feed ring 50 is moved downwards until at the end of its stroke the apertures 52 coincide with ducts 38 thus connecting chamber 39, and therefore slurry feed line 8, with the space between rubber sleeve 16 and the outside of filter cloth 9. At this point slurry is fed through line 8 into the filtration unit. On completion of the slurry feed, air is introduced via line 44 and port 31 into cell 43, at the same time connecting cell 42, line 45 and therefore port 29 to exhaust. Air pressure on flange 25 moves feed ring 50 upwards thus sealing duct 38 and disconnecting the supply of slurry. Residual slurry in the slurry supply system is removed by applying vacuum to line 8.

In order to effect filtration a hydraulic liquid at low pressure is fed via lines 12 and 13 to the space between rubber sleeve 16 and the interior of case 1. The filtrate passes through the filter cloth and apertures 3 into the interior of tube 20 whence it is removed via filtrate line 62. After about 10 seconds the pressure of hydraulic fluid is increased and filtration completed after about 2 minutes at high pressure. Upon completion of filtration, the hydraulic fluid is removed and vacuum applied to draw rubber sleeve 16 back against the outer case thus forming a cavity between the filter cake adhering to the filter cloth and sleeve 16.

Removal of the filter cake is achieved by lowering filter unit 2 by means of jack 32 and applying a blast of air through line 7 to dislodge the cake after which unit 2 is raised and another cycle commenced.

I claim:

1. In a candle displacement filtration apparatus of the kind which comprises a cylindrical housing accommodating a hollow perforated cylindrical body or candle, and impermeable elastic sleeve disposed within the annular space defined by the inside of the housing and the outside of the cylindrical body and circumferentially attached at its ends to the housing of the cylindrical body, thereby dividing the annular space into an inner filtration compartment and an outer pressure applying compartment, a filter element disposed around and supported by the cylindrical body, outlet means for the discharge of filtrate which has passed through the filter element into the cylindrical body, an inlet into the inner compartment for liquid/solid mixtures, an inlet into the outer compartment for a hydraulic fluid under pressure, means for displacing the hollow perforated cylindrical body, or candle, axially relative to the cylindrical housing so that the cake adhering to the candle is exposed and can be discharged, and an inlet into the interior of the cylindrical body for compressed air, the improvement wherein the inlet to the inner compartment for liquid/solid mixtures comprises a substantially cylindrical chamber provided with circumferentially spaced apertures adapted to connect with the inner compartment, said chamber being located at one end of the cylindrical body in an extension thereof, an inlet line or lines into said chamber and a hollow cylindrical member coaxial with said extension and movably constructed and arranged to cover or expose said apertures and to form with said extension a cell the ends of which are defined by flanges extending from said hollow cylindrical member and slidably engaging with the walls of said extension, said cell being divided by a piston integral with said extension, means being provided on either side of said piston for supplying or venting air to or from either side of the cell.

2. An apparatus as claimed in claim 1 wherein the cylindrical member is provided with apertures which, in one position of the member, coincide with the apertures in the chamber.

* * * * *